(12) United States Patent
Moller et al.

(10) Patent No.: US 6,826,522 B1
(45) Date of Patent: Nov. 30, 2004

(54) METHODS AND APPARATUS FOR IMPROVED EFFICIENCY IN PIPELINE SIMULATION AND EMULATION

(75) Inventors: Christian Henrik Luja Moller, Cary, NC (US); Carl Donald Busboom, Cary, NC (US); Dale Edward Schneider, Durham, NC (US)

(73) Assignee: PTS Corporation, San Jose, CA (US)

( * ) Notice: Subject to any disclaimer, the term of this patent is extended or adjusted under 35 U.S.C. 154(b) by 756 days.

(21) Appl. No.: 09/598,567

(22) Filed: Jun. 21, 2000

Related U.S. Application Data

(60) Provisional application No. 60/140,163, filed on Jun. 21, 1999.

(51) Int. Cl.[7] ............................. G06F 9/455; G06F 13/00
(52) U.S. Cl. ................................ 703/22; 703/26; 712/21
(58) Field of Search .............................. 703/19, 20, 24, 703/26, 21; 712/18, 24, 21, 216; 710/26

(56) References Cited

U.S. PATENT DOCUMENTS

| | | | | |
|---|---|---|---|---|
| 5,542,058 A | * | 7/1996 | Brown, III et al. ......... | 395/375 |
| 5,881,265 A | * | 3/1999 | McFarland et al. ......... | 395/394 |
| 5,946,474 A | * | 8/1999 | Skogby ....................... | 395/500 |
| 6,023,753 A | * | 2/2000 | Pechanek et al. ............. | 712/18 |
| 6,059,835 A | * | 5/2000 | Bose ............................ | 703/19 |
| 6,173,243 B1 | * | 1/2001 | Lowe et al. .................. | 703/14 |
| 6,356,994 B1 | * | 3/2002 | Barry et al. .................. | 712/24 |
| 6,366,999 B1 | * | 4/2002 | Drabenstott et al. .......... | 712/24 |
| 6,446,191 B1 | * | 9/2002 | Pechanek et al. ............. | 712/24 |
| 6,453,367 B2 | * | 9/2002 | Barry .......................... | 710/26 |
| 6,499,116 B1 | * | 12/2002 | Roth et al. .................... | 714/39 |

* cited by examiner

*Primary Examiner*—Thai Phan
(74) *Attorney, Agent, or Firm*—Priest & Goldstein, PLLC

(57) ABSTRACT

Techniques for achieving the effects of significantly reducing the amount of computer memory needed to simulate the behavior of a multi-stage pipelined processor, as well as, significantly increasing the performance of the simulation process by eliminating the storing and copying of redundant information are described. These beneficial effects are achieved by reordering the chronological sequence of execution of software models of the various pipeline stages with respect to the actual instruction-flow sequence implemented by the processor hardware. This approach takes advantage of the independence of the stages within a cycle to make the results computed by a previous stage directly available to its subsequent stage without the use of transient data space or data copying. In particular, it is shown how to apply this technique to the simulation of a multi-parallel-stage VLIW array processor, such as the manifold array (ManArray) processor.

20 Claims, 8 Drawing Sheets

```
current_insn     := NULL;
current_controls := NULL;              ← 1100
current_results  := NULL;

do_forever {
    if (current_results != NULL)
        condret(current_results);

if (current_controls != NULL)
    {
        next_results    := execute(current_controls); ⎫ 1120
        current_results := next_results;              ⎭

} if (current_insn != NULL)
    {
        next_controls    := decode(current_insn); ⎫ 1120
        current_controls := next_controls;        ⎭
    } next_insn    := fetch();   ⎫ 1120
    current_insn := next_insn; ⎭
}
```

| | | STAGE ┌─1300 | | | |
|---|---|---|---|---|---|
| | | FETCH | DECODE | EXECUTE | COND.RET. |
| CYCLE 4 | TIME SLICE | I4 | I3 | I2 | I1 ─ 1301 |
| | (I1 POSTED) | I4 | I3 | I2 | - ─ 1302 |
| | (I2 EXECUTED) | I4 | I3 | - | I2 ─ 1304 |
| | (I3 DECODED) | I4 | - | I3 | I2 |
| | (I4 FETCHED) | - | I4 | I3 | I2 |
| CYCLE 5 | | I5 ─1310 | I4 | I3 ─1308 | I2 ─1306 |

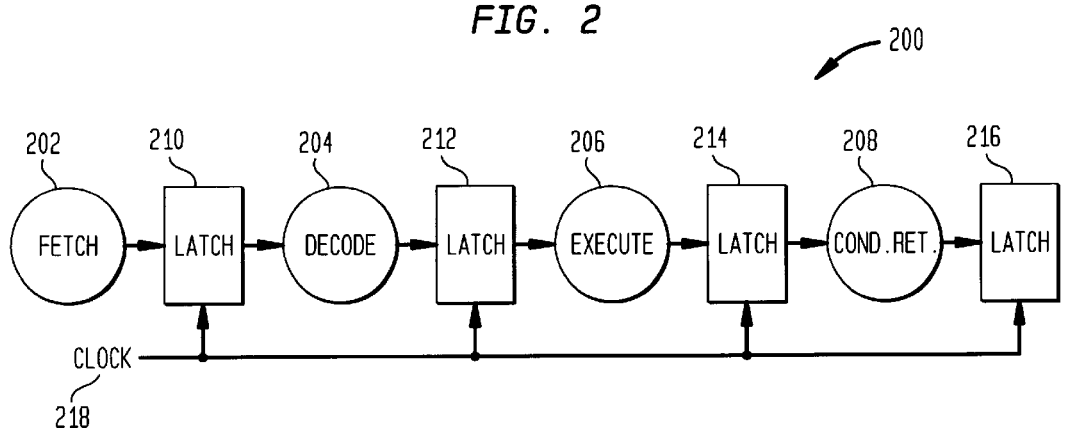

FIG. 5

```
                    ╭─ 500
do_forever {
    fetch();
    decode()
    execute();
    condret();
}
```

FIG. 6

| STAGE | | | | |
|---|---|---|---|---|
| | FETCH | DECODE | EXECUTE | COND.RET. |
| CYCLE 1 | I1 | | | |
| | | I1 | | |
| | | | I1 | |
| | | | | I1 |
| CYCLE 2 | I2 | | | |
| | | I2 | | |
| | | | I2 | |
| | | | | I2 |
| CYCLE 3 | ETC | | | |

FIG. 7

```
                    ╭─ 700
do_forever {
            I1
            jump label
            I3
            I4
            I5
            I6
label:      I7
            I8
            I9
}
```

| | STAGE | | | |
|---|---|---|---|---|
| | FETCH | DECODE | EXECUTE | COND.RET. |
| CYCLE 1 | I1 | | | |
| CYCLE 2 | jump | I1 | | |
| CYCLE 3 | nop | jump | I1 | |
| CYCLE 4 | I7 | nop | jump | I1 |
| CYCLE 5 | I8 | I7 | nop | jump |
| CYCLE 6 | I9 | I8 | I7 | nop |
| CYCLE 7 | ETC | | | |

```
901 { current_insn     := NULL;
      current_controls := NULL;
      current_results  := NULL;

902 { next_controls    := NULL;
      next_results     := NULL;

903 —do_forever {

904 —next_insn := fetch();

905 —if (current_insn != NULL)
        next_controls := decode(current_insn);

906 —if (current_controls != NULL)
        next_results := execute(current_controls);

907 —if (current_results != NULL)
        condret(current_results);

current_insn     := next_insn;
      current_controls := next_controls;   } 920
      current_results  := next_results;
    }
```

FIG. 10

```
current_insn      := NULL;
current_controls  := NULL;                    ← 1000
current_results   := NULL;

next_controls     := NULL;
next_results      := NULL;

do_forever { if (current_results != NULL)
    condret(current_results);

if (current_controls != NULL)
    next_results := execute(current_controls);

if (current_insn != NULL)
    next_controls := decode(current_insn);

next_insn := fetch();

current_results  := next_results;
  current_controls := next_controls;    } 1020
  current_insn     := next_insn;
}
```

FIG. 11

```
current_insn     := NULL;
current_controls := NULL;          ← 1100
current_results  := NULL;

do_forever { if (current_results != NULL)
    condret(current_results);

if (current_controls != NULL)
  {
    next_results    := execute(current_controls);  ⎫
    current_results := next_results;               ⎬ 1120
  }                                                ⎭ if (current_insn    != NULL)
  {
    next_controls    := decode(current_insn);      ⎫
    current_controls := next_controls;             ⎬ 1120
  }                                                ⎭ next_insn    := fetch();                         ⎫
  current_insn := next_insn;                       ⎬ 1120
}                                                  ⎭
```

FIG. 12

```
                                    ← 1200
current_insn     := NULL;
current_controls := NULL;
current_results  := NULL;

do_forever ( if (current_results != NULL)
    condret(current_results);

if (current_controls != NULL)
    current_results := execute(current_controls);

if (current_insn != NULL)
    current_controls := decode(current_insn);

current_insn     := fetch();
}
```

FIG. 13

| | | STAGE | | | | |
|---|---|---|---|---|---|---|
| | | FETCH | DECODE | EXECUTE | COND.RET. | |
| CYCLE 4 | TIME SLICE | I4 | I3 | I2 | I1 | — 1301 |
| | (I1 POSTED) | I4 | I3 | I2 | - | — 1302 |
| | (I2 EXECUTED) | I4 | I3 | - | I2 | — 1304 |
| | (I3 DECODED) | I4 | - | I3 | I2 | |
| | (I4 FETCHED) | - | I4 | I3 | I2 | |
| CYCLE 5 | | I5 | I4 | I3 | I2 | |

```
1402 ~ do_for_all ExccecutionUnits(DSU, MAU, ALU, LU, SU){        1400
            current_insn    [EU]:= NULL;
            current_controls[EU]:= NULL;
            current_results[EU]:= NULL;
    }
    do_forever {

//do a total of 5 iterations in the following order:

//1st DSU, 2nd MAU, 3rd ALU, 4th LU, 5th SU do_for_allExecutionUnits(DSU, MAU, ALU, LU, SU){ if (current_results[EU] != NULL)
                    condret(current_results[EU]);

if (current_controls[EU] != NULL)
                    current_results[EU] := execute(current_controls[EU]);

if (current_insn[EU] != NULL)
                    current_controls[EU] := decode(current_insn[EU]);

}
        //fetch the next instruction, if non-VLIW, put it in the proper pipeline, otherwise extend //the pipeline to include the predecode stage and this stage will fetch all instructions from //the proper VLIW memory location and place them in the proper pipelines.

1404 ~ insn := fetch()

1406 ~ switch(typeof(insn)){ case DSU:
                    current_insn[DSU]:=insn;
            case MAU:
                    current_insn[MAU]:=insn;
            case ALU:
                    current_insn[ALU]:=insn;
1408 {      case LU:
                    current_insn[LU]:=insn;
            case SU:
                    current_insn[SU]:=insn;
            case VLIW:
                    extend_pipe();
                    //next cycle fetch from VLIW memory
        }
1403 —— Post processing step()       //Level broadcast resolution
                                     //PEXCHG, SPSEND, SPRECV
                                        communication resolution
    }
```

METHODS AND APPARATUS FOR IMPROVED EFFICIENCY IN PIPELINE SIMULATION AND EMULATION

RELATED APPLICATIONS

The present invention claims the benefit of U.S. Provisional Application Ser. No. 60/140,163 entitled "Methods and Apparatus for Improved Efficiency in Pipeline Simulation and Emulation" and filed Jun. 21, 1999 which is incorporated herein by reference in its entirety.

FIELD OF THE INVENTION

The present invention relates generally to improvements in the simulation and emulation of multi-stage pipelined processors. In particular, the present invention describes advantageous methods and apparatus for eliminating a large quantity of redundant information during the simulation process. This reduction results in reduced numbers of saving and copying steps in the process of simulating or emulating the behavior of multi-parallel-stage VLIW array processors, such as the Manifold array (ManArray) processor.

BACKGROUND OF THE INVENTION

In the development process for the design of a new processor, a simulator of the processor is typically created for test and verification purposes prior to implementing the design in an implementation-level hardware description language. Since the simulator is run on an existing processor to emulate the design of the new processor, it will of necessity have to emulate sequentially the large number of internal operations which will ultimately be done in parallel on the proposed processor. Such a simulator consequently runs considerably more slowly than the proposed processor it is intended to simulate, particularly if the architecture of the proposed processor is innately highly parallel such as is the case with processors using very long instruction word (VLIW) concepts and array processing mechanisms. At times, it is also desirable to emulate operation of one system with another for a variety of purposes.

In most modern computers, the execution of a single instruction is performed in a number of stages, such as the following, presented by way of example:

fetch—reads the next instruction from memory, decode—interprets the instruction bit pattern to determine what operation is to be done, execute—does the operation, and post/conditional return—stores results for later use.

Generally speaking, in a pipelined computer, instructions pass through these stages in the order shown in such a way that all of the stages may be in use simultaneously, each performing tasks associated with different instructions. Implicit in this mechanism is the assumption that all of the stages can operate independently in a given cycle. For example, the process of fetching an instruction in a given cycle can have no effect during that cycle on the decoding of the instruction fetched in the previous cycle.

Also generally speaking, a simulator program typically emulates the hardware in a similar fashion, i.e., in the order shown. To do this, the simulation process must compute and temporarily store within each emulated pipeline stage the potentially large amount of information needed by the subsequent stage. For example, in a VLIW architecture, the decode stage must compute the next-cycle controls for a potentially large number of execution-stage units: arithmetic logic units (ALUs), multiply accumulate units (MAUs), and the like. Storing multiple copies of this information, current-cycle information and next-cycle information, uses a significant amount of memory, and copying the information from stage to stage takes significant time slowing the simulation. The present invention offers a way to significantly reduce both the memory and time requirements while achieving additional advantages as described in further detail below.

SUMMARY OF THE INVENTION

The present invention significantly reduces the amount of computer memory needed to simulate the behavior of a multi-parallel-stage pipelined processor, as well as significantly increasing the performance of the simulation process by eliminating or substantially reducing the storing and copying of redundant information. These results are achieved by reordering the chronological sequence of execution of software models of the various pipeline stages with respect to the actual instruction-flow sequence implemented by the processor hardware. The invention takes advantage of the independence of the stages and independence of the execution units within a cycle to make the results computed by a previous stage directly available to its subsequent stage without the use of transient data space or data copying. This technique can be used for the simulation and hardware emulation of existing sequential processors, new processor designs, or custom hardware to accurately and efficiently model the behavior of the processor/hardware, such as a multi-parallel-stage pipelined processor.

These and other features, aspects and advantages of the invention will be apparent to those skilled in the art from the following detailed description taken together with the accompanying drawings.

BRIEF DESCRIPTION OF THE DRAWINGS

FIG. 2 illustrates a high level view of a typical pipeline block diagram;

FIG. 3 illustrates the cycle-by-cycle sequence of a single instruction as it passes through the pipeline stages;

FIG. 4 illustrates multiple instructions as they pass through the pipeline stages;

FIG. 5 illustrates a simplistic emulation of the pipeline stages;

FIG. 6 illustrates the pipeline usage for a simplistic emulation of the pipeline stages;

FIG. 7 illustrates a code sequence with a branch;

FIG. 8 illustrates the pipeline usage for a code sequence with a branch;

FIG. 9 illustrates an exemplary simulation program;

FIG. 10 illustrates a first reordered exemplary simulation program;

FIG. 11 illustrates a second reordered exemplary simulation program;

FIG. 12 illustrates a third exemplary simulation program with redundant statements removed; and FIG. 13 illustrates multiple instruction passage through the pipeline stages.

FIG. 14 illustrates inter-execution unit Communication.

DETAILED DESCRIPTION

Figure 1:
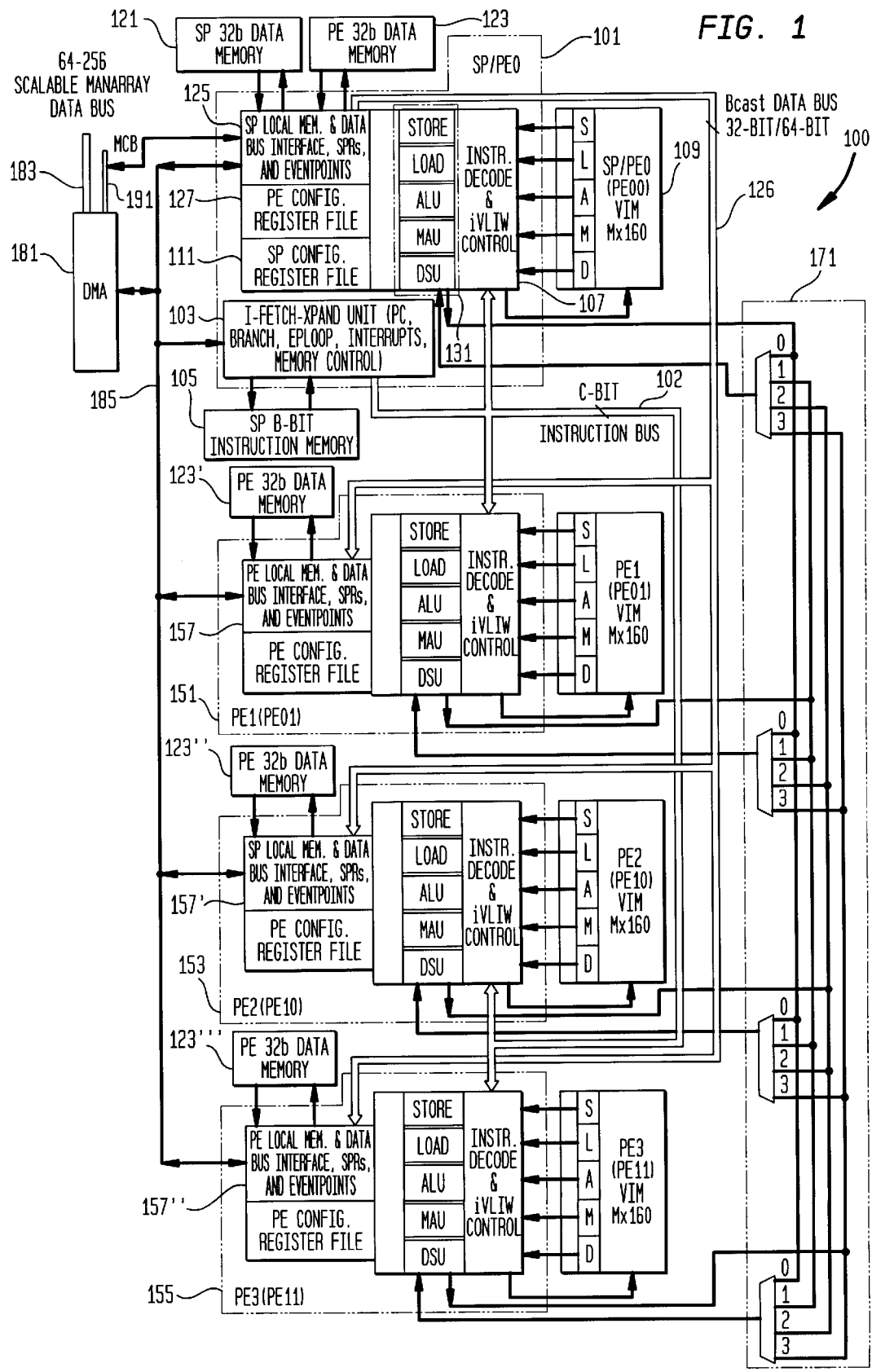
FIG. 1 illustrates an exemplary 2×2 ManArray iVLIW processor.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999 entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999 entitled "Methods and Apparatus for Providing Direct Memory Access Control", U.S. patent application Ser. No. 09/596,103 entitled "Methods and Apparatus for Data Dependent Address Operations and Efficient Variable Length Code Decoding in a VLIW Processor" filed Jun. 16, 2000, U.S. patent application Ser. No. 09/598,566 entitled "Methods and Apparatus for Generalized Event Detection and Action Specification in a Processor" filed Jun. 21, 2000, U.S. patent application Ser. No. 09598,564 entitled "Methods and Apparatus for Initiating and Resynchronizing Multi-Cycle SIMD Instructions" filed Jun. 21, 2000, U.S. patent application Ser. No. 09/598,558 entitled "Methods and Apparatus for Providing Manifold Array (ManArray) Program Context Switch with Array Reconfiguration Control" filed Jun. 21, 2000, and U.S. patent application Ser. No. 09/598,084 entitled "Methods and Apparatus for Establishing Port Priority Functions in a VLIW Processor" filed Jun. 21, 2000, as well as, Provisional Application Serial No. 60/113,637 entitled "Methods and Apparatus for Providing Direct Memory Access (DMA) Engine" filed Dec. 23, 1998, Provisional Application Serial No. 60/113,555 entitled "Methods and Apparatus Providing Transfer Control" filed Dec. 23, 1998, Provisional Application Serial No. 60/139,946 entitled "Methods and Apparatus for Data Dependent Address Operations and Efficient Variable Length Code Decoding in a VLIW Processor" filed Jun. 18, 1999, Provisional Application Serial No. 60/140,245 entitled "Methods and Apparatus for Generalized Event Detection and Action Specification in a Processor" filed Jun. 21, 1999, Provisional Application Serial No. 60/140,163 entitled "Methods and Apparatus for Improved Efficiency in Pipeline Simulation and Emulation", filed Jun. 21, 1999, Provisional Application Serial No. 60/140,162 entitled "Methods and Apparatus for Initiating and Re-Synchronizing Multi-Cycle SIMD Instructions" filed Jun. 21, 1999, Provisional Application Serial No. 60/140,244 entitled "Methods and Apparatus for Providing One-By-One Manifold Array (1×1 ManArray) Program Context Control" filed Jun. 21, 1999, Provisional Application Serial No. 60/140,325 entitled "Methods and Apparatus for Establishing Port Priority Function in a VLIW Processor" filed Jun. 21, 1999, Provisional Application Serial No. 60/140,425 entitled "Methods and Apparatus for Parallel Processing Utilizing a Manifold Array (ManArray) Architecture and Instruction Syntax" filed Jun. 22, 1999, Provisional Application Serial No. 60/165,337 entitled "Efficient Cosine Transform Implementations on the ManArray Architecture" filed Nov. 12, 1999, and Provisional Application Serial No. 60/171,911 entitled "Methods and Apparatus for DMA Loading of Very Long Instruction Word Memory" filed Dec. 23, 1999, Provisional Application Serial No. 60/184,668 entitled "Methods and Apparatus for Providing Bit-Reversal and Multicast Functions Utilizing DMA Controller" filed Feb. 24, 2000, Provisional Application Serial No. 60/184,529 entitled "Methods and Apparatus for Scalable Array Processor Interrupt Detection and Response" filed Feb. 24, 2000, Provisional Application Serial No. 60/184,560 entitled "Methods and Apparatus for Flexible Strength Coprocessing Interface" filed Feb. 24, 2000, and Provisional Application Serial No. 60/203,629 entitled "Methods and Apparatus for Power Control in a Scalable Array of Processor Elements" filed May 12, 2000, respectively, all of which are assigned to the assignee of the present invention and incorporated by reference herein in their entirety.

To highlight the inventive concepts, the ManArray processor is used as an example of a processor having an exemplary array VLIW multi-parallel-stage pipeline that must be simulated. In a presently preferred embodiment of the present invention, the invention is used to simulate the architecture and emulate the hardware of the processing done by a ManArray 2×2 iVLIW single instruction multiple data stream (SIMD) processor 100 shown in FIG. 1. FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also shown to be used in various algorithms such as the 8×8 2D Inverse Discrete Cosine Transform (IDCT) as described in further detail in U.S. Provisional Application Serial No. 60/165,337 entitled "Methods and Apparatus for Efficient Cosine Transform Implementation". It is noted that the PEs can be also labeled with their matrix positions as shown in parentheses for PE0 (PE00) 101, PE1 (PE01) 151, PE2 (PE10) 153, and PE3 (PE11) 155. The SP/PE0 101 contains a fetch controller 103 to allow the fetching of short instruction words (SIWs), also known as native instructions, from a B=32-bit instruction memory 105. The fetch controller 103 provides the typical functions needed in a programmable processor such as a program counter (PC), branch capability, digital signal processing eventpoint loop operations, support for interrupts, and also provides the instruction memory management control which could include an instruction cache if needed by an application. In addition, the SIW I-Fetch controller 103 dispatches 32-bit SIWs to the other PEs in the system by means of a C=32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, such as fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. Store, load, arithmetic logic unit (ALU), multiply accumulate unit (MAU), and data select unit (DSU) instruction types are identified by the letters SLAMD in VIM 109 as follows: store (S), load (L), ALU (A), MAU (M), and DSU (D). The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain their own physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 more completely described in U.S. Pat. No. 6,023,753 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

All of the above noted patents are assigned to the assignee of the present invention and incorporated herein by reference in their entirety.

We turn now to details of techniques for improved efficiency in pipeline simulation in accordance with the present invention. The ManArray array VLIW processor pipeline for sequential non-VLIW instructions is:

fetch—reads the next instruction from memory, decode—interprets the instruction bit pattern to determine what operation is to be done, execute—does the operation, and post/condition return—posts the side effects of execution to a programmer visible flag register.

This pipeline will be used in the following description, but it is noted that greater complexity in the pipeline does not preclude the utilization of the invention, but rather serves to make the invention more valuable for use with such more complex designs. For example, the ManArray processor has a dynamic pipeline which inserts an extra pipeline stage upon recognition of an indirect VLIW execute instruction, see U.S. patent application Ser. No. 09/228,374 entitled "Methods and Apparatus to Dynamically Reconfigure the Instruction Pipeline of an indirect Very Long Instruction Word Scalable Processor" for further details of this dynamic pipeline. The ManArray simulator using the present invention emulates this dynamic pipeline providing a substantially increased efficiency of emulation over previous approaches. In addition, the ManArray processor also uses two execute stages for MAU operations. These variations to the basic four-stage pipeline require additional state information to be saved. Since the concepts described in the present invention are all applicable to these more complex pipelines, the simpler four-stage pipeline described above is used to illustrate the inventive concepts.

The processor pipeline stages are typically interconnected as shown in FIG. 2. A processor pipeline 200 includes fetch 202, decode 204, execute 206, and conditioned return 208 stages with corresponding latches 210, 212, 214, 216, and a clock 218. In operation, each pipeline stage works with the data available to it at the beginning of each cycle. At the end of each cycle, the output of each stage is stored (by the clock signal) in the associated latch. Each latch holds state information and data relevant to the particular phase of whatever instruction is being executed by that stage. It is noted that in VLIW architectures, multiple execution pipelines are in operation in parallel. The concepts of this invention are applicable to each VLIW pipeline that operates in parallel.

With such an architecture, the execution of a single instruction takes multiple cycles, as shown in cycle table 300 of FIG. 3. Since each stage is, by design, independent of the other stages except at their interfaces, multiple instructions can be in various stages of the pipeline simultaneously, as shown in table 400 of FIG. 4, where instruction symbols I1–I4 represent. different instructions in the pipeline.

For a number of reasons, creating a simulation program to emulate this kind of pipelined architecture is not as straightforward as it might appear. For example, even though each stage in a hardware pipeline is working simultaneously, software emulation of the pipeline is, in the nature of standard processors, sequential. This presents the problem of finding a mechanism of emulating in sequential software, events that occur simultaneously in hardware, and doing so in such a way that the state of the simulation at specific times accurately reflects the state of the hardware being emulated. For example, consider the obviously simplistic emulation routine 500 shown in FIG. 5, where fetch( ), decode( ), execute( ), and condition retun( ) (condret( )) represent software subroutines that emulate each instruction's pipeline stages. Using such emulation routines sequentially as shown in FIG. 5 for each stage of the pipeline, effectively ignores the pipeline altogether. Each instruction is fetched, decoded, executed, and posted independently, all in one pass through the software emulation cycle loop, i.e., all in one representative cycle of the new processor, as shown in table 600 of FIG. 6.

This result is an inaccurate representation of the pipeline. The emulation that each instruction is completed before the next instruction emulation is started does not correctly emulate the processor hardware operation. In the exemplary ManArray processor pipeline, the instructions immediately following any type of branch, conditional or unconditional, and prior to the branch target address, are either not executed at all if the branch is taken, or are executed completely if the branch is not taken. In simulation, emulation of this operation is accomplished by stalling the pipeline appropriately. Given a code sequence 700 as shown in FIG. 7, the pipeline usage for the ManArray processor of FIG. 1 might be as shown in table 800 of FIG. 8. Obviously, the overly simplistic emulation model as depicted in FIG. 6, does not accurately emulate the overlapping operations shown in FIG. 8.

This problem occurs because each of the ordered executions of the four pipeline emulation subroutines, fetch( ), decode( ), execute( ), and condret( ), implicitly affects the input conditions of the following subroutine. A solution to this problem might be to rewrite the emulation code or reorder the emulation hardware as shown in code 900 of FIG. 9. In FIG. 9, the initial state of the "current_xx" variables 901 are set to NULL indicating no operation is to occur. The next state "next_xx" variables 902 are also initialized to the NULL state. The simulation routine begins with a "do_forever" statement 903. The first step 904 is to start the fetch emulation subroutine that fetches an instruction and sets "next_insn" to the fetched instruction. Since the first time through this loop the current instruction is NULL the "if" construct 905 checking for a not equal condition "!=" will not be true causing the program to proceed to the next statement 906 which is another "if" statement. Since the "current_controls=NULL" the program proceeds to the next "if" statement 907. The "current_results" is also NULL so the program advances to the point 920 where the variables "current_insn, current_controls, and current_results" are set to the "next_xx" state values.

In the simulation model 900 of FIG. 9, the state of each simulation stage (corresponding respectively to the fetcho, decodes, executes, and condreto subroutines) is captured at the end of each cycle (corresponding to a single pass through the "do_forever" loop). For example, the state of the fetch stage is recorded as next_insn, the state of the decode stage as next_controls, and so on. At the end of each cycle, the current state of the machine is updated by copying each of the new state sets (next_insn, etc.) to the current state sets (current_insn, etc.).

There is a drawback to this approach. Even though the state capture and update operations 920 shown in FIG. 9 are represented as simple assignments, the actual state of any given pipeline stage can be complex. The state may be composed of many thousands, of discrete signals. For example, the state of the decode stage of a VLIW machine must be complex enough to simultaneously control the subsequent execution of any number of execution units. With the ManArray iVLIW processor, the amount of state information grows significantly with the addition of each PE. Simply recording and copying this information can take significant system resources, adversely affecting simulation performance.

Referring back to FIG. 9, the present invention recognizes, however, that since the state of each stage is being captured, the order in which the stages are executed, during any cycle or time-slice of the processor operation, is immaterial and could be rearranged as shown in a first reordered simulation program 1000 shown in FIG. 10.

Note that in program 1000 the information used by the condition return stage, current_results, is not referred to again for the duration of the emulation cycle. The same is true for all instances of captured states. Further, it is no longer necessary to initialize the next_* variables, so it is possible to rearrange the update operations of line 1020 from FIG. 10 to that shown in program 1100 of FIG. 11. This rearrangement of FIG. 11 makes the current_*:=next_*; statements 1120 redundant so they may be rewritten as shown in program 1200 of FIG. 12.

The effect of this reordering is to eliminate the requirement for redundant state sets and the subsequent need to copy this potentially large volume of information from one place to another in the course of every simulation cycle. Referring back to FIG. 4, the effect of the reordering for cycle 4 is shown piecemeal in FIG. 13. The cycle-4 time slice of FIG. 4 is shown for reference in first row 1301 and then in simulation order, instruction I1, in the condret stage, is posted, effectively emptying the stage 1302. This allows I2 to execute and pass results to the now vacated condret stage 1304, in turn unblocking the I3 decode and the I4 fetch to move their next stage of operation 1306 and 1308 respectively. Finally, the fetch stage being empty, a new instruction I5 is queued at stage 1310.

As was previously stated, in VLIW architectures parallel pipelines exist, one pipeline for each execution unit, which execute simultaneously. Consequently, the techniques of this invention are used in each of the parallel pipeline stages to reduce the amount of stage information needed to be stored and shared for each of the parallel pipeline stages.

There are multiple execution units all operating simultaneously and in parallel, such as units SU, LU, ALU, MAU, DSU of unit 131 of FIG. 1, that must be simulated sequentially. As previously stated, the pipeline stage execution order is reordered, from fetch-decode-execute-condret to condret-execute-decode-fetch. These VLIW parallel pipelines will be reordered in the same manner.

The ManArray processor's current execution priority is from highest to lowest that is SU, LU, ALU, MAU and DSU. This execution priority is described in further detail in U.S. patent application Ser. No. 09/598,084 entitled "Methods and Apparatus for Establishing Port Priority Functions in a VLIW Processor" filed Jun. 21, 2000 and U.S. Provisional Application Serial No. 60/140,325 filed Jun. 21, 1999 having the same title, both of which are incorporated by reference herein in their entirety. The simulated multiple execution unit order is then first DSU, second MAU, third ALU, fourth LU, and fifth SU. This mechanism of simulating the hardware priority order backwards allows for an accurate sequential simulation which at the end of the sequential processing produced the same hardware priority order of SU, LU, ALU, MAU, and DSU. If multiple execution units were attempting to target the same register, the sequential simulation would write that same register multiple times, but the contents of the target register would end up being loaded by the last unit that targeted the register, thereby matching the parallel hardware priority.

Referring to program 1400 of FIG. 14, the program of FIG. 12 has been expanded to two dimensions to include the parallel pipelines of each execution unit, where [EU], 1402 and throughout the program, in the program refers to the $i^{th}$ Execution Unit selected in the $1^{st}$ DSU, $2^{nd}$ MAU, $3^{rd}$ ALU, $4^{th}$ LU, and $5^{th}$ SU order. Note that insn 1404 refers to instruction, and the switch function 1406 chooses the one particular case 1408 of instruction in the desired order, a reverse order for the ManArray priority requirements, to ensure proper emulation of the hardware. This program is complex enough to accurately model the sequential simulation of all the parallel pipelines. Note that for the indirect VLIW instructions such as execute VLIW on the ManArray processor there is an additional fetch of the VLIW from the VLIW memory (VIM) to be accounted for, as noted in the last "case VLIW" statement 1410 of the program. This expansion and contraction of the ManArray pipeline is described in further detail in U.S. patent application Ser. No. 09/228,374 entitled "Methods and Apparatus to Dynamically Reconfigure the Instruction Pipeline of an Indirect Very Long Instruction Word Scalable Processor" and filed Jan. 12, 1999.

This technique is scalable to any number of array elements and continues to function properly in either single instruction stream-single data stream (SIMD) or synchronous multiple instruction stream-multiple data stream (SMIMD) processors.

Additionally, this technique allows for a post cycle-step processing function 1400, as seen in FIG. 14, to accomplish inter-execution unit communication. Examples of this are the load broadcast instructions which provide data to each PE memory, and PEXCHG, SPSEND, SPRECV instructions which provide register data to be passed between processors.

The techniques of the present invention substantially increase the performance of multi-stage pipeline simulations or hardware emulations by eliminating redundant state-information saving and copying. They also enhance the maintainability of the emulation software or emulation hardware by reducing its complexity and redundancy. While the present invention has been disclosed in the context of various aspects of presently preferred embodiments, it will be recognized that the invention may be suitably applied to other environments and applications consistent with the claims which follow.

We claim:

1. A method of simulation of a multi-parallel-stage pipelined processor resulting in greatly reduced memory requirements and reduction of stage state data copying, the method comprising the steps of:

reordering a chronological sequence of a plurality of pipeline stages as a reverse order of execution of software models of the plurality of pipeline stages with respect to the actual instruction-flow sequence implemented by a processor performing the software simulation, wherein said multi-parallel-stage pipelined processor comprises a plurality of execution units, each execution unit modeled as a stage in the plurality of pipeline stages, the plurality of execution units having execution priorities ranging from highest to lowest, said software simulation of the execution units performed in order of lowest priority to highest priority; and taking advantage of independence of stages within a cycle to be simulated or emulated to make results computed by a previous stage directly available to a subsequent stage without using additional data space or data copying than is required for pipeline stage processing.

2. The method of claim 1 wherein said steps of reordering and taking advantage are performed to sequentially simulate operation of a plurality of very long instruction words (VLIW), the plurality of VLIWs which operate in parallel as a plurality of pipelines.

3. The method of claim 1 further comprising the step of capturing the state of each stage of the multi-parallel-stage pipelined processor during each cycle.

4. The method of claim 1 wherein the stages of the multi-parallel-stage pipelined processor include fetch, decode, execute and conditional return stages; and the state of each of said stages is captured at the end of each cycle.

5. The method of claim 1 wherein the method of simulation of the multiparallel-stage pipelined processor is a single pass method of simulation.

6. A method of hardware emulation of a multi-parallel-stage pipelined processor resulting in greatly reduced memory requirements and reduction of stage state data copying, the method comprising the steps of:

reordering a chronological sequence of execution of software models of a plurality of pipeline stages with respect to the actual instruction-flow sequence implemented by a processor performing the hardware emulation, wherein said multi-parallel-stage pipelined processor comprises a plurality of execution units, each execution unit modeled as a stage in the plurality of pipeline stages, the plurality of execution units having execution priorities ranging from highest to lowest, said emulation of the execution units performed in order of lowest priority to highest priority; and taking advantage of independence of stages within a cycle to be simulated or emulated to make results computed by a previous stage directly available to a subsequent stage without using additional data space or data copying than is required for pipeline stage processing.

7. The method of claim 6 wherein said steps of reordering and taking advantage are performed to simulate multiple very long instruction word (VLIW): pipelines that operate in parallel.

8. The method of claim 6 further comprising the step of capturing the state of each stage of the multi-parallel-stage pipelined processor during each cycle.

9. The method of claim 6 wherein the stages of the multi-parallel-stage pipelined processor include fetch, decode, execute and conditional return stages; and the state of each of said stages is captured at the end of each cycle.

10. The method of claim 6 further comprising a post processing step to accomplish execution resolution of local broadcast and PEXCHG, SPSEND, and SPRECV communication instructions.

11. Apparatus for simulating a multi-parallel-stage pipelined processor resulting in greatly reduced memory requirements and reduction of stage state data copying, the apparatus comprising:

means for reordering a chronological sequence of a plurality of pipeline stages as a reverse order of execution of software models of the plurality of pipeline stages with respect to the actual instruction-flow sequence implemented by a processor performing the software simulation, wherein said multi-parallel-stage pipelined processor comprises a plurality of execution units, each execution unit modeled as a stage in the plurality of pipeline stages, the plurality of execution units having execution priorities ranging from highest to lowest, said software simulation of the execution units performed in order of lowest priority to highest priority; and means for taking advantage of independence of stages within a cycle to be simulated or emulated to make results computed by a previous stage directly available to a subsequent stage without using additional data space or data copying than is required for pipeline stage processing.

12. The apparatus of claim 11 wherein said means for reordering and taking advantage are utilized to sequentially simulate multiple very long instruction word (VLIW): pipelines that operate in parallel.

13. The apparatus of claim 11 further comprising means for capturing the state of each stage of the multi-parallel-stage pipelined processor during each cycle.

14. The apparatus of claim 11 wherein the stages of the multi-parallel-stage pipelined processor include fetch, decode, execute and conditional return stages; and further comprising means for capturing the state of each of said stages at the end of each cycle.

15. The apparatus of claim 11 wherein the apparatus for simulation of the multi-parallel-stage pipelined processor is operable in a single pass.

16. Hardware apparatus for emulation of a multi-parallel-stage pipelined processor resulting in greatly reduced memory requirements and reduction of stage state data copying, the apparatus comprising:

means for reordering a chronological sequence of execution of software models of a plurality of pipeline stages with respect to the actual instruction-flow sequence implemented by a processor performing the hardware emulation, wherein said multi-parallel-stage pipelined processor comprises a plurality of execution units, each execution unit modeled as a stage in the plurality of pipeline stages, the plurality of execution units having execution priorities ranging from highest to lowest, said emulation of the execution units performed in order of lowest priority to highest priority; and means for taking advantage of independence of stages within a cycle to be simulated or emulated to make results computed by a previous stage directly available to a subsequent stage without using additional data space or data copying than is required for pipeline stage processing.

17. The apparatus of claim 16 wherein said means for reordering and taking advantage are utilized to simulate multiple very long instruction word (VLIW): pipelines that operate in parallel.

18. The apparatus of claim 16 further comprising means for capturing the state of each stage of the multi-parallel-stage pipelined processor during each cycle.

19. The method of claim 16 wherein the stages of the multi-parallel-stage pipelined processor include fetch, decode, execute and conditional return stages; and further comprising means for capturing the state of each of said stages at the end of each cycle.

20. The method of claim 16 further comprising means for performing a post processing step to accomplish execution resolution of local broadcast and PEXCHG, SPSEND, and SPRECV communication instructions.

* * * * *